(No Model.)
M. W. ILES.
APPARATUS FOR TREATING SLAG.
No. 505,552. Patented Sept. 26, 1893.
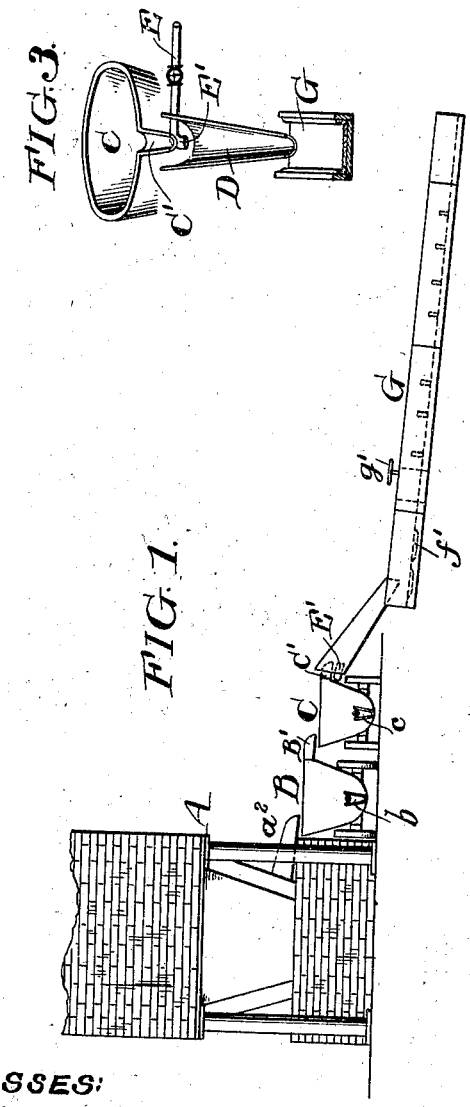
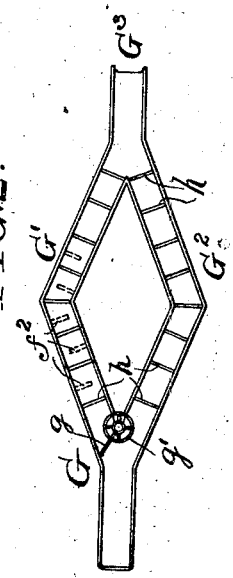
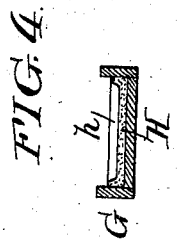
WITNESSES:
INVENTOR:

UNITED STATES PATENT OFFICE.

MALVERN W. ILES, OF DENVER, COLORADO.

APPARATUS FOR TREATING SLAG.

SPECIFICATION forming part of Letters Patent No. 505,552, dated September 26, 1893.

Application filed February 21, 1893. Serial No. 463,210. (No model.)

*To all whom it may concern:*

Be it known that I, MALVERN W. ILES, a citizen of the United States, residing at Denver, in the county of Arapahoe in the State of Colorado, have invented a certain new and useful Improvement in Apparatus for Treating Slag to Recover Valuable Metalliferous Particles, of which the following is a true and exact description, reference being had to the accompanying drawings, which form a part of this specification.

My invention relates to apparatus for treating slag and consists in an apparatus whereby the molten slag is granulated and the heavier metalliferous particles separated from the lighter worthless granules in a simple and inexpensive manner.

Generally speaking my invention consists in combining with means for granulating slag a channel for conducting away the slag mixed with water and providing means in said channel for catching and retaining the heavier matte containing particles; preferably I form the channel with branches and provide means for shutting off a branch at will so as to facilitate the removal of the collected metalliferous granules.

The nature of my improvements will be best understood as described in connection with the drawings in which they are illustrated, and in which—

Figure 1 is an elevation of an apparatus designed to embody my invention. Fig. 2 is a plan of the channel showing the branches. Fig. 3 is a plan of the slag trough, and Fig. 4 a detail of the channel G.

A represents a metallurgic furnace having a slag spout $a^2$.

B, represents a matte pot into which mixed slag and matte is drawn from the furnace A and from which the matte as it accumulates may be drawn by the matte tap $b$ while the slag runs from the slag spout B'. A second settling pot C with like matte tap $c$ and slag spout $c'$ may be provided.

E, represents a water pipe ending in a nozzle E' which may be slightly flattened if desired and which is adapted to conduct a stream of water into the water chute D and directly under the slag spout $c'$. This chute D is rather steeply inclined at an angle of about thirty degrees or forty degrees and empties into a channel G which is nearly horizontal. The chute D is preferably made of cast iron and may be funnel shaped as shown in Fig. 3. The channel is made of heavy planking and has two branches G' and G"; and in the channel G where the two channels G' and G" branch off is arranged a gate $g$ by which a current in the channel G may be turned into either of the branches G' and G" as desired. In the branch channels are arranged riffles $h$ preferably secured upon a false floor H of iron.

The operation is as follows: Slag flows from the slag spout $a^2$ of the furnace A and the matte which accompanies it is allowed to subside in the settling pot B and the impoverished slag flows into a second settling pot C where the same process is repeated. The slag in the second pot C still contains however, valuable matte and metalliferous particles which it is desirable to save. The melted slag flows, preferably in a thin stream, into the water jet issuing from the nozzle E' and by admixture with the cold water is broken up and granulated. Passing along with the current of water into one of the branches G', the heavier granules containing metallic particles are separated by the well known action of riffles and are detained behind in the channels while the slag passes along with the water current and is discharged at the lower end $G^3$ of the channel where it may undergo any proper treatment to accomplish a further separation of the metalliferous particles if desired. When a sufficient quantity of metalliferous particles is collected in the channel G' the gates may be shifted, turning the current into the other branch channel G" and the collected particles removed.

While two settling posts are shown in which much of the matte is removed from the slag by subsidence, one may be sufficient.

While I prefer to arrange the channel G with branches it is evident that I may also use a straight channel G without branching and form the riffles in this channel.

Two channels G' and G" are shown, but it is evident that any number that may be convenient may be used, and the gate constructed to turn the current of water in channel G into any branch or branches desired.

Riffle bars as shown are deemed the most convenient means of partially arresting the current and of catching the heavier metalliferous particles as they are borne down with the current, but boxes sunk in the floor as shown in dotted lines at $f'$ or criss-cross bars extending alternately from either side as shown at $f^2$ or any other like means may be used as preferred.

The current of water I prefer to use is such as would be obtained by a head of twenty or thirty feet, but this may be modified according to the nature of the material to be separated and the size of the slag stream.

Having now described my invention, what I claim as new, and desire to secure by Letters Patent, is—

1. The apparatus for treating slag consisting of a steeply inclined water chute where heated slag is mixed with the water to granulate it, a slag spout leading thereto, a second and nearly horizontal channel into which the first chute leads and riffles situated in said channel for separating the matte and metalliferous particles from the slag.

2. In an apparatus for treating slag the combination of a channel adapted to convey granulated slag and water and having two or more branches a gate in the channel whereby the water and slag can be directed into different branches at will and riffle bars in the level channel branches for arresting the metalliferous particles in the current of water.

3. An apparatus for treating slag consisting of a slag spout a steeply inclined water channel into which the slag spout leads, a second channel having branches and provided with riffle bars in said branches to arrest the metalliferous particles in the water current.

4. An apparatus for treating slag consisting of a slag spout opening over a steeply inclined water channel a second and nearly horizontal channel having branches, a gate to direct the current of water and slag into any branch desired and riffles in the branches to arrest the metalliferous particles carried by the water current.

MALVERN W. ILES.

Witnesses:
JOHN S. WILLIAMS,
JOHN M. WALKER.